United States Patent

Heming et al.

[15] 3,645,714

[45] Feb. 29, 1972

[54] BALANCED RELEASE PELLETED BARK PRODUCTS AND PROCESS

[72] Inventors: Elizabeth C. Heming; Warren W. Mathews; William J. Wilson, all of Vancouver, British Columbia, Canada

[73] Assignee: MacMillan Bloedel Limited, Vancouver, British Columbia, Canada

[22] Filed: May 23, 1969

[21] Appl. No.: 827,172

[52] U.S. Cl. ....................71/23, 71/24, 71/64 F, 71/64 G
[51] Int. Cl. ..........................................C05f 11/02
[58] Field of Search..........................71/23, 24, 64 F, 64 G

[56]     References Cited

UNITED STATES PATENTS

| 2,912,317 | 11/1959 | Gloss | 71/24 |
| 3,218,149 | 11/1965 | Sproull et al. | 71/29 X |
| 3,269,824 | 8/1966 | Aswell | 71/64 G |
| 3,140,921 | 7/1964 | Barrow | 71/64 G |

*Primary Examiner*—Reuben Friedman
*Assistant Examiner*—Bennett H. Levenson
*Attorney*—Fetherstonhaugh & Co.

[57]     ABSTRACT

There is disclosed a method for producing the resultant pelleted products for horticultural and other purposes made up of bark from the group hemlock, balsam, spruce, pine, redwood, or mixtures thereof, said bark being blended with water-soluble nutrient fertilizer material. The blended mixture may contain other inert materials, such as wood, peat moss and the like, with or without the addition of other active ingredients, such as herbicides, pesticides, nutrients, and the like. These products readily disintegrate on contact with moisture in the soil and manifest balanced release characteristics.

5 Claims, No Drawings

BALANCED RELEASE PELLETED BARK PRODUCTS AND PROCESS

BACKGROUND OF THE INVENTION

This invention relates to pelleted wood bark products and more particularly to pelleted bark products which disintegrate upon being contacted with soil moisture, and a process for their production.

In view of the general practice of debarking all logs utilized in sawmills and the necessity for removal of bark in plywood and pulp mills prior to peeling or chipping, by-products are obtained in the form of the removed bark which is available in substantial quantities at all types of log processing plants. Although there is a substantial market for some physically separated components of bark, the principal use of the bark products is as a fuel, a use for which it is poorly adapted. Accordingly, it is an object of this invention to provide new commercial products utilizing bark.

It is known that the addition of certain organic wastes, such as sawdust, leaves, etc., to soil improves the structure. The organic waste materials have never been popular as soil additives because they are difficult to handle and are also poor in nitrogen content.

Commercial fertilizer compositions are of various types, but most of them contain water-soluble materials which can be readily assimilated by plants. The use of fertilizers in agriculture is increasing rapidly and the cost of fertilizers is an important economic factor. The water-soluble ingredients, such as nitrogen, potassium and phosphorus compounds which are the most commonly used, are often too rapidly leached out of the fertilizer composition and carried away by surface and ground waters long before the growing plants can gather and assimilate the nutritive elements. Hence, in many cases a large proportion of the desirable nutritive elements is lost and to this extent the fertilizer is wasted.

Numerous attempts have been made in the prior art to reduce the water solubility and leaching rate of fertilizer materials, while at the same time not rendering them incapable of assimilation in growing plants. For example, a number of attempts have been made to incorporate small quantities of fertilizer in fairly high proportions of relatively water-insoluble carriers such as asphalt, resins, plastics, wax and the like. In some cases the fertilizer ingredients themselves have purposely been made relatively insoluble. In other instances, granules or other small particles of the fertilizer have been coated with water repellent or water resistant materials including such as those named above. In general, these procedures have not been very effective. Thus, if the fertilizer particles are very highly waterproofed, they prevent assimilation by the plants of the needed fertilizer ingredients. If plastic hydrocarbon coating materials which retain a tacky or cold flow property, such as wax or asphalt, are employed, they tend to cohere and agglomerate unduly or to pack in large lumps during periods of storage.

Other difficulties that are encountered in applying fertilizers to soil are (a) neutralization of the materials by reaction with soil components e.g., phosphate fixation, and (b) their destruction by micro-organisms before they can be assimilated by the plant e.g., the action of denitrifying bacteria.

There is also a growing interest today in supplying trace metal micronutrients to plants. More and more it has become appreciated that the so-called trace elements of copper, iron, zinc, boron, molybdenum and many others which are important to the proper growth of plant life must be supplied to cultivated plants else quality or quantity of the crop suffers. As a practical matter there is a difficulty of evenly distributing the very small quantities of these trace metals in the soil.

Again with materials such as herbicides and pesticides there is a problem of releasing these materials in small uniform quantities into the soil.

SUMMARY OF THE INVENTION

According to this invention it has been determined that certain wood bark materials can be compressed into pellets which readily disintegrate when contacted by soil moisture and which can also serve as a matrix into which can be incorporated various active materials such as fertilizers, pesticides, herbicides, micronutrients, etc.

DESCRIPTION OF THE PREFERRED EMBODIMENTS

Among particularly suitable bark materials that can be used for producing the pellets of this invention there can be mentioned hemlock, balsam, spruce, pine and redwood bark, or mixtures thereof. The pellets can be used directly without any additive as a soil conditioner or any of the materials mentioned above can be incorporated into the bark matrix and the compacted bark material then serves to control the rate of release of the active material.

In order to have both good handling strength characteristics and rapid breakdown in the presence of moisture, the matrix material, i.e., the organic compound, of the pellets should contain at least 75 percent by weight of the bark material. The balance of the matrix can consist of materials such as wood, peat moss, and the like. Commercially available barking waste from saw mills processing hemlock and balsam logs will normally contain about 20 percent by weight of wood and this has been found to be an excellent pellet matrix.

The pellets can contain up to 50 percent by weight of active ingredients while still exhibiting satisfactory handling and moisture breakdown characteristics. When commercial fertilizer components are incorporated into the pellets, these are preferably present in amounts of 2 to 50 percent by weight.

The size of the pellets can be varied over a wide range, and for fertilizer materials to be applied by commercial spreaders is limited only by the size of the holes in the spreaders. Pellets ranging in diameter from about three thirty-seconds inch to about one-quarter inch and a length of about the same general order are normally used, while pellets having a diameter and length of about one-eighth inch are preferred.

There are numerous advantages to be obtained in the use of the pellets of this invention. The matrix material itself is an excellent mulch which breaks down rapidly to act as a very effective soil conditioner.

The matrix also serves as an excellent carrier for active ingredients, such as fertilizers, pesticides and the like, and provides a controlled release of the active ingredients into the ground. It has very surprisingly been found that when fertilizers are incorporated into the matrix, the pellets obtained provide a more uniform release of the fertilizer nutrients into the ground and better growth results are obtained than with comparative commercial fertilizer compositions now on the market.

Furthermore, the pellets of the invention are less dusty to handle than powdered bark products or peat moss, and have a higher density so that shipping bulk is decreased, and they are easier to spread.

The pellets of the invention are easily formed using available commercial pelleting machines.

In producing the pellets, the barking waste is broken down to particles no larger than about one-quarter inch, dried to allow the material to be hammer milled, and then hammer milled or pulverized to pass 90 percent through a 10 mesh screen.

It has been found that the moisture content of the particulate matrix material is an important factor in obtaining satisfactory pellets, and this moisture content should be within the range of 5 to 40 percent. Preferably, the moisture content is maintained within the range of 8 to 25 percent for optimum results.

The particulate matrix material with appropriate moisture content is fed to a pelleting machine, such as an extrusion pellet mill, and the pellets obtained are cooled, dried if necessary, and screened.

If these pellets are to contain active ingredients, such as fertilizers, herbicides, pesticides, and the like, these are blended with the particulate matrix material and the blend is fed to the pellet mill. As above indicated, the water content of the blended mixture to be pelletized preferably should be within the range of 8 to 25 percent.

Preferred embodiments of the invention are illustrated by the following examples. In these examples, tests results are shown for percentage breakdown in water, referred to hereinafter as "Percentage Breakdown in Water-Test A" and "Percentage Breakdown in Water-Test B," and leaching tests are included. The procedures used for these tests are as follows:

PERCENTAGE BREAKDOWN IN WATER - TEST A 5 grams of pellets (plus 10 mesh) are immersed in cold water for 10 minutes. They are then placed in a 40 mesh basket and subjected to a 40 pound water pressure spray for 10 minutes and the residue is then dried overnight at 80° C. The residue is then rescreened to plus 10 mesh and the weight loss calculated to give the percentage breakdown.

PERCENTAGE BREAKDOWN IN WATER - TEST B

This test is similar in all respects to test A except that a soaking time of 2 minutes and a spraying time of 5 minutes are used.

EXAMPLE 1

A mixture of Western Hemlock bark (Tsuga Heterophylla) and Balsam Fir bark (coastal abies species), usually known as Hembal was obtained from a mill. This bark mixture contained about 10–20 percent wood and had a size range showing about 80 percent less than 1 inch.

It was hogged through a one-half inch screen on a knife-type hog (Pallman granulator PS 4–2 ½), then dried to 10 percent moisture content in a rotary drum drier. The dried bark was then pulverized in a hammer mill (Prater Pulverizer), using a screen with one-eighth inch diameter holes. The particle size of the final product was 90 percent less than 12 mesh, as determined on Canadian Standard Sieves.

A 100 lb. batch of 6–8–6 bark fertilizer pellets was then prepared using the above bark mixture as a pellet matrix. The fertilizer components used were a commercial grade 11–48–0 ammonium phosphate containing 48 percent $P_2O_5$, a commercial grade 46–0–0 urea containing 46 percent nitrogen and a commercial grade 0–0–60 potassium chloride containing 60 percent $K_2O$.

The pellets were prepared from the following components calculated on a dry basis:

| | | |
|---|---|---|
| Bark mixture (10% moisture) | 70.6 lbs. | |
| (oven dry weight) | | 64.2 lbs. |
| Water (to adjust moisture to 20%) | 6.4 lbs. | |
| Ammonium phosphate | | 16.7 lbs. |
| Urea | | 9.1 lbs. |
| Potassium chloride | | 10.0 lbs. |
| Total (dry basis) | | 100.0 lbs. |

The particulated ingredients were blended mechanically for 20 minutes with the additional water being sprayed on to the mixture during blending for adjusting the water content in the mixture within the range maintained for obtaining the pellets.

The blend was then pelleted in an extrusion pellet mill (California Model CL Type 3 Laboratory Pellet Mill) using a ⅛ inch × ½ inch L-89 Laboratory die, with the knives set to produce a ⅛ inch × ⅛ inch pellet. The pellets were produced at a rate of 45 lbs./hr. and were simultaneously cooled, dried and screened in an air current at ambient temperature, after which they were stored in bags.

EXAMPLE 2

Following the general procedure of Example 1, a variety of different pellets was prepared from Hembal barks with different matrix additives. Pellets were prepared both with and without fertilizer components and were tested for breakdown in water. The compositions of the pellets and the results obtained are tabulated in the following Table I:

TABLE I

| Material | Particle Size Canadian Standard Sieve) | Addition % | % Breakdown in Water Test A |
|---|---|---|---|
| Hembal bark | 90%–10 mesh | 0 | 62 |
| Hembal bark | 90%–10 mesh | 10% Hemlock wood | 76 |
| Hembal bark | 90%–10 mesh | 20% Hemlock wood | 83 |
| Hembal bark | 90%–10 mesh | 10% Peat Moss | 57 |

| | | Test B |
|---|---|---|
| Bark + 10-6-4 Fertilizer (7% moisture content) | 90%–60 mesh | 90 |
| (10% moisture content) | 90%–60 mesh | 53 |
| (12% moisture content) | 90%–60 mesh | 50 |

EXAMPLE 3

Pellets were prepared using different matrix materials and were tested for percentage breakdown in water. These pellets were prepared using the same general procedure as in Example 1.

The results obtained are shown in Table II below:

TABLE II

| Pellet Matrix Composition | Pellet Size | % Breakdown in Water - Test A |
|---|---|---|
| Peat Moss - 100% | 3/16×½ inch | 18 |
| Douglas Fir Bark - 100% | 3/16×½ inch | 7 |
| Cedar Bark - 100% | 3/16×½ inch (pellets with difficulty) | 100 |
| Hembal Bark - 100% | 3/16×½ inch | 64 |
| Hembal Bark - 90% Hembal Wood - 10% | 3/16×½ inch | 76 |
| Hembal Bark - 80% Hembal Bark - 20% | 3/16×½ inch | 83 |
| Hembal Bark - 30% Hembal Wood - 70% | 3/16×½ inch | 100 |
| Hembal Bark - 60% Douglas Fir Bark - 40% | 3/16×½ inch | 8 |
| Hembal Bark - 20% Douglas Fir Bark - 80% | 3/16×½ inch | 17 |

This example shows that some matrix materials show poor ability to breakdown in water and it was also found that pellets with high-wood contents had very poor handling strength. For proper handling strength not more than about 25 percent wood should be present.

EXAMPLE 4

Using the procedure of Example 1, pellets of various sizes were prepared and tested for breakdown in water.

The pellet composition and test results are shown in Table III below.

TABLE III

| Pellet Matrix Composition | Particle Size | Pellet Size | % Breakdown in Water Test A |
|---|---|---|---|
| Hemlock bark | 90%–60 mesh | ⅛×⅛ inch | 100 |
| Hemlock bark | 90%–10 mesh | ⅛×⅛ inch | 66 |
| Hemlock bark + 10-6-4 fertilizer | 90%–60 mesh | 3/16×½ inch | 97 |
| Hemlock bark + 10-6-4 fertilizer | 90%–10 mesh | 3/16×½ inch | 96 |

These results show that particle size of the bark matrix material is not a critical factor of this invention.

EXAMPLE 5

Fertilizer pellets were prepared according to the procedure of Example 1 having a matrix of pulverized Hemlock bark 82 percent less than 30 mesh.

These pellets, together with several comparative commercial fertilizer preparations, were subjected to leaching tests in which 10 grams of pellets were placed in a beaker and soaked in 200 ml. of water for periods of 2, 6 and 24 hours. The water was then drained from the pellets, using suction and the pellets analyzed.

The results obtained are shown in Table IV below, these being calculated as to nutrient leached from the original, allowing for weight loss during leaching:

TABLE IV

| | 2 hours | | | 6 hours | | | 24 hours | | |
|---|---|---|---|---|---|---|---|---|---|
| | N | P₂O₅ | K₂O | N | P₂O₅ | K₂O | N | P₂O₅ | K₂O |
| 10-0-0 hemlock | 83 | | | 85 | | | 86 | | |
| 20-0-0 hemlock | 81 | | | 82 | | | 84 | | |
| 10-6-4 hemlock | 84 | 84 | 87 | 85 | 84 | 89 | 87 | 86 | 90 |
| 6-8-6 hemlock | 81 | 76 | 86 | 83 | 78 | 87 | 85 | 84 | 89 |
| 10-6-4 buckerfields. | 89 | 40 | 64 | 93 | 47 | 72 | 96 | 42 | 89 |
| 6-8-6 valley pride. | 50 | 24 | 81 | 59 | 25 | 92 | 58 | 22 | 89 |

This table illustrates the very remarkable and highly desirable balanced release of nutrients from the pellets of this invention as compared with the usual commercial products.

The following tests indicate the burning effects on lawn grass of standard fertilizers as compared to fertilizing pellets made in accordance with the present invention:

Materials
  Competitive        6-8-6 fertilizer
  Competitive        10-6-4 fertilizer
  Hemlock Bark       6-8-6 fertilizer
  Hemlock Bark       10-6-4 fertilizer Treatment Levels
  4 lb. N/1,000 sq. ft. of lawn
  8 lb. N/1,000 sq. ft. of lawn
Time
  One week after application
Results

TABLE V

| Treatment Product | Level lb. N/1,000 sq. ft. | Levels | |
|---|---|---|---|
| | | 4 | 8 |
| Competitive | 6-8-6 | Slight Burning | Severe Burning |
| Hemlock Bark | 6-8-6 | No Burning | No Burning |
| Competitive | 10-6-4 | Slight Burning | Severe Burning |
| Hemlock Bark | 10-6-4 | No Burning | No Burning |

The usual recommended applications of commercial fertilizers for lawns is 2 lb. N per 1,000 sq. ft. The above results show that use of a bark based fertilizer gave a reduced burning hazard when applied at high levels on lawn grass compared with competitive products.

The following comparative tests indicate the growth results with the present pellets and with other fertilizers:

TEST 1

Materials

| Hemlock Bark | 5-4-0 |
| Sewage Sludge based | 5-4-0 |
| Inorganic | 5-4-0 |
| Control | 0-0-0 |
| Hemlock Bark | 6-8-6 |
| Sewage Sludge based | 6-8-6 |
| Inorganic | 6-8-6 |
| Control | 0-0-0 |

Treatment Level
  2,000 lb./acre

Soils
  1. Alderwood      Sandy Loam
  2. Ladner Clay    Silty Loam

Crop
  Lettuce - Grand Rapids
Time
  3 months
Results

TABLE VI

| Fertilizer | | Variable: Dry Weight at Harvest Dry Weight as % Control | |
|---|---|---|---|
| Bark Based | 5-4-0 | 129 | |
| Sewage Sludge based | 5-4-0 | 106 | Soil 1 |
| Inorganic | 5-4-0 | 110 | |
| Control | 0-0-0 | 100 | |
| Bark based | 6-8-6 | 2,325 | |
| Sewage Sludge based | 6-8-6 | 1,888 | Soil 2 |
| Inorganic | 6-8-6 | 1,453 | |
| Control | 0-0-0 | 100 | |

These results show that improved growth was obtained with the bark based formulations.

TEST 2

Materials

| Hemlock Bark | 5-4-0 | Barley |
| Inorganic | 5-4-0 | |
| Hemlock Bark | 6-8-6 | Beets |
| Inorganic | 6-8-6 | Lettuce |

Soil
   Ladner Clay - Silty Loam

Crops
   Barley       Trebi
   Lettuce      Grand Rapids
   Beet         Detroit Dark Red Treatment Level - 2,000 lb./acre Time
   Barley       3 months
   Lettuce      2 months
   Beet         2 months Results

TABLE VII

| Crop | Mean Height of Crop Bark | Inorganic | Control |
|---|---|---|---|
| Lettuce Midperiod | 13.3 mm. | 11.8 mm. | 4.5 mm. |
| Final | 14.0 mm. | 13.6 mm. | — |
| Barley Midperiod | 53.7 cm. | 48.0 cm. | 42.9 cm. |
| Final | 59.9 cm. | 56.1 cm. | 49.4 cm. |
| Beet | 11.1 mm. | 9.7 mm. | 7.9 mm. |
| Mean Dry-Weights | | | |
| Lettuce | 1.1 g. | 0.7 g. | 0.04 g. |
| Barley | 0.82 g. | 0.72 g. | 0.33 g. |
| Beets | 0.12 g. | 0.08 g. | 0.05 g. |

We claim:

1. A process for producing a bark-based pelleted fertilizer product affording a balanced release of nutrients and having a high extent of breakdown in water comprising the steps of:

providing a matrix comprising at least 75 percent by weight of pulverized bark material and which may contain up to 25 percent by weight of wood, said bark material being selected from the group consisting of hemlock, balsam, spruce, pine, redwood, and mixtures thereof, said matrix including from about 8 to 25 percent by weight of moisture and having a particle size such that at least 90 percent of the particles are less than 60 mesh, Canadian Standard Sieve Size;

mechanically blending said pulverized particulate material with from about 2 to about 50 percent by weight, of particulate, water soluble, nutrient fertilizer material to disperse the fertilizer throughout the pulverized material while adding to the blend any water necessary to bring the moisture content in the blended mixture to about 8 to 25 percent by weight;

and compacting the mixture into pellets.

2. A process according to claim 1 wherein said bark comprises western hemlock bark.

3. A process according to claim 2 wherein said bark comprises a mixture of 90 percent Western Hemlock bark and 10 percent Balsam Fir bark.

4. A process according to claim 1 wherein said nutrient fertilizer material is selected from the group consisting of ammonium phosphate, urea, and potassium chloride.

5. A bark-based pelleted fertilizer product affording a balanced release of nutrients, produced by the process of claim 1.

* * * * *